(12) United States Patent
Matthews et al.

(10) Patent No.: US 7,814,317 B1
(45) Date of Patent: *Oct. 12, 2010

(54) MULTIPLE PASSWORD DOCUMENTS

(75) Inventors: Brian L Matthews, Kent, WA (US); Scott Olechowski, Monte Sereno, CA (US); Cayce M Ullman, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 831 days.

This patent is subject to a terminal disclaimer.

(21) Appl. No.: 10/969,220

(22) Filed: Oct. 19, 2004

(51) Int. Cl.
*H04L 29/06* (2006.01)
(52) U.S. Cl. .......................... 713/165; 380/45
(58) Field of Classification Search .......... 713/165; 380/45
See application file for complete search history.

(56) References Cited

U.S. PATENT DOCUMENTS

| | | | |
|---|---|---|---|
| 4,218,738 A * | 8/1980 | Matyas et al. | 705/72 |
| 5,276,735 A * | 1/1994 | Boebert et al. | 713/167 |
| 5,495,533 A | 2/1996 | Linehan et al. | |
| 5,787,169 A * | 7/1998 | Eldridge et al. | 713/165 |
| 5,838,790 A * | 11/1998 | McAuliffe et al. | 713/176 |
| 6,119,227 A * | 9/2000 | Mao | 713/171 |
| 6,249,866 B1 * | 6/2001 | Brundrett et al. | 713/165 |
| 6,249,886 B1 * | 6/2001 | Kalkunte | 714/47 |
| 6,263,348 B1 | 7/2001 | Kathrow et al. | |
| 6,345,256 B1 * | 2/2002 | Milsted et al. | 705/1 |
| 6,496,847 B1 | 12/2002 | Bugnion et al. | |
| 6,911,974 B2 * | 6/2005 | Asano et al. | 345/204 |
| 6,912,634 B2 * | 6/2005 | Ripley et al. | 711/164 |
| 6,947,556 B1 * | 9/2005 | Matyas et al. | 380/29 |
| 6,983,365 B1 * | 1/2006 | Douceur et al. | 713/165 |
| 7,043,637 B2 * | 5/2006 | Bolosky et al. | 713/171 |
| 7,110,982 B2 | 9/2006 | Feldman et al. | |
| 7,272,231 B2 | 9/2007 | Jonas et al. | |
| 7,277,998 B1 | 10/2007 | Agesen et al. | |
| 7,280,956 B2 | 10/2007 | Cross et al. | |
| 7,343,493 B2 | 3/2008 | Challener et al. | |
| 7,590,868 B2 | 9/2009 | Musa et al. | |
| 2002/0106086 A1 * | 8/2002 | Kamiya et al. | 380/277 |
| 2002/0178271 A1 * | 11/2002 | Graham et al. | 709/229 |

* cited by examiner

*Primary Examiner*—Edan Orgad
*Assistant Examiner*—James Turchen
(74) *Attorney, Agent, or Firm*—Hickman Palermo Truong & Becker LLP

(57) ABSTRACT

An apparatus, method, and computer-readable media capable of encrypting and unencrypting secure documents with multiple passwords and/or fallback keys. Embodiments allow documents to unencrypt themselves or be able to be unencrypted with multiple passwords. Methods embodiments include the creation of self-encrypted documents that provide for multiple password decryption, and may include the automatic generation of at least one fallback key to facilitate unencryption of documents.

52 Claims, 8 Drawing Sheets

MULTIPLE PASSWORD DOCUMENTS

BACKGROUND

1. Field of the Invention

Aspects of the present invention relate in general to an apparatus, system and method of generating a fallback key for a password-protected document. Further aspects of the present invention include an apparatus, method, and computer-readable medium capable of unencrypting a document with multiple passwords, and a fallback key.

2. Background of the Invention

With so much of a user's information stored digitally and protected by passwords, a user may forget or misplace a password. When the protected information is stored on one or more central servers, forgetting a password may simply result in contacting a customer service agent or web site to reset the password. However, when the password is protecting an encrypted document, resetting the password is not sufficient, as the encrypted document will still be encrypted with the old (forgotten) password.

DETAILED DESCRIPTION

What is needed is an apparatus, method, and computer-readable medium capable of unencrypting a document with multiple passwords and/or fallback keys.

Aspects of the present invention include an apparatus, method, and computer-readable media capable of encrypting and unencrypting secure documents with multiple passwords and/or fallback keys. One aspect of the invention is allowing documents to unencrypt themselves or be able to be unencrypted with multiple passwords. Another aspect of the invention is the automatic generation of at least one fallback key to facilitate unencryption of documents.

For the purposes of this application, "documents" are any electronic file known in the art. The terms "unencrypt" and "decrypt" are synonymous.

Embodiments of the present invention include an apparatus, method and computer-readable media that enable encryption and unencryption of secure documents with multiple passwords and/or fallback keys. Methods embodiments include the creation of self-encrypted documents that provide for multiple password decryption. Yet in other method embodiments, embodiments may allow for the automatic generation of "fall back keys," which allow the unencryption of the document.

Figure 1:
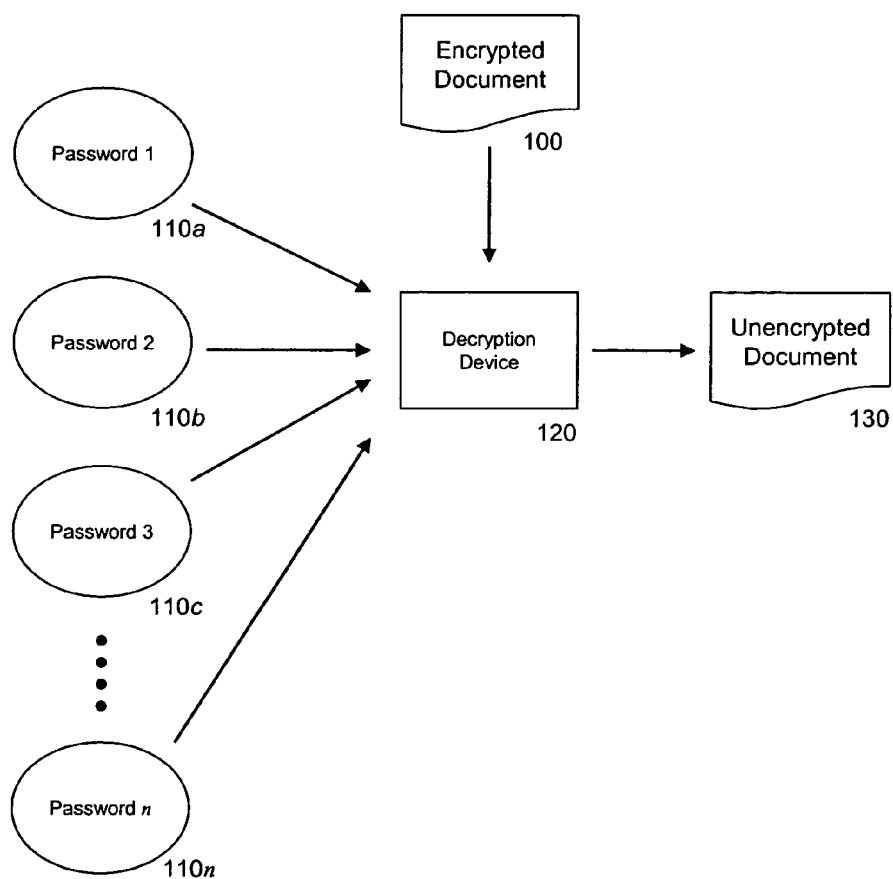
FIG. 1 illustrates an embodiment of a system where an encrypted document may be unencrypted by entering one of many passwords or fallback keys into a decryption device.

FIG. 1 illustrates an embodiment of a system 10 where an encrypted document may be unencrypted by entering one of many passwords or fallback keys into a decryption device, constructed and operative in accordance with an embodiment of the present invention. As shown in this illustration, a decryption device 120 is able to generate an unencrypted document 130 from an encrypted document 100 and at least one of any number of passwords 110a-n and/or fallback keys 115x.

Figure 2:
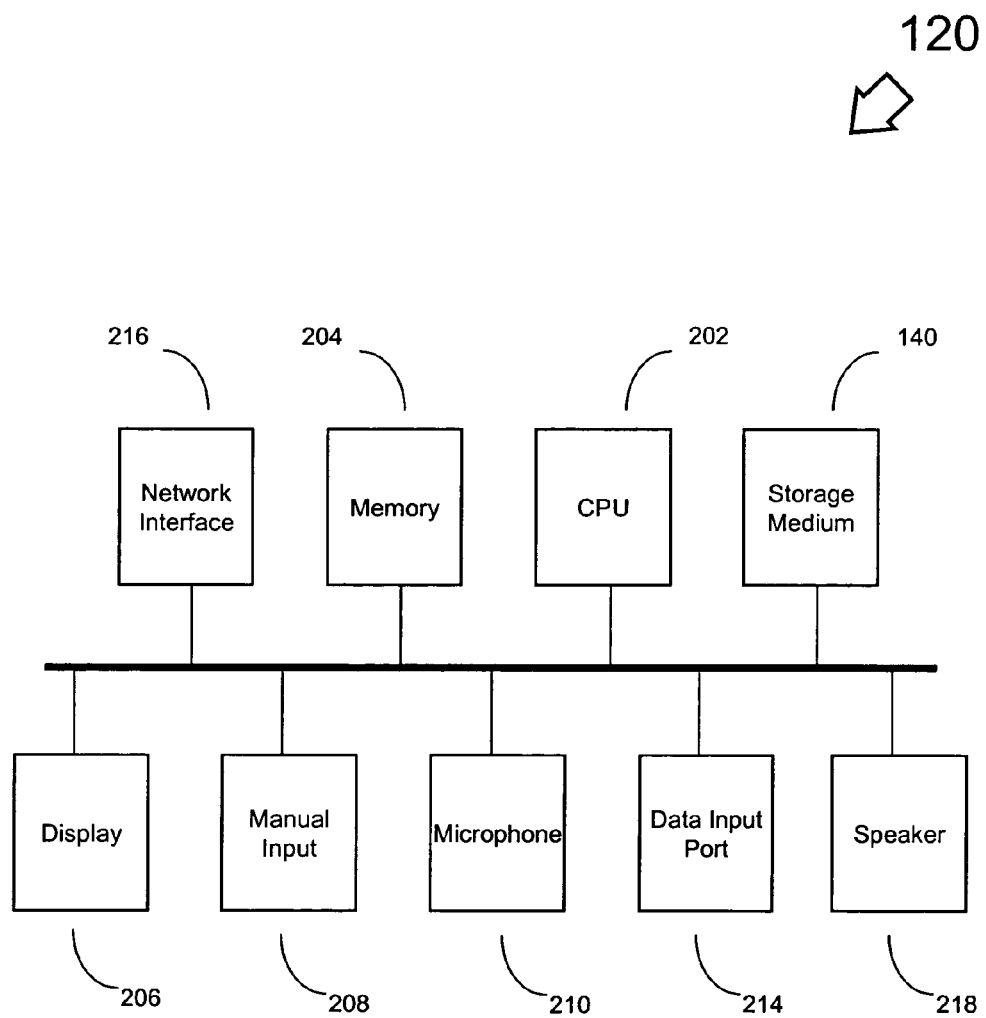
FIG. 2 is an act diagram of an apparatus that receives multiple passwords or fallback keys to unencrypt an encrypted document.

Embodiments will now be disclosed with reference to a functional act diagram of an exemplary decryption device 120 of FIG. 2, constructed and operative in accordance with an embodiment of the present invention. Decryption device 120 may run a real-time multi-tasking operating system (OS) and include at least one processor or central processing unit (CPU) 202. Processor 202 may be any microprocessor or micro-controller as is known in the art.

The software for programming the processor 202 may be found at a computer-readable storage medium 240 or, alternatively, from another location across network 110. Processor 202 is connected to computer memory 204. Decryption device 120 may be controlled by an operating system that is executed within computer memory 204.

Processor 202 communicates with a plurality of peripheral equipment, including network interface 216. Additional peripheral equipment may include a display 206, manual input device 208, storage medium 240, microphone 210, and data port 214.

Display 206 may be a visual display such as a cathode ray tube (CRT) monitor, a liquid crystal display (LCD) screen, flat-panel display, touch-sensitive screen, or other monitors as are known in the art for visually displaying images and text to a user.

Manual input device 208 may be a conventional keyboard, keypad, mouse, trackball, joystick, light pen, areas of a touch-sensitive screen or other input device as is known in the art for the manual input of data.

Storage medium 240 may be a conventional read/write memory such as a magnetic disk drive, floppy disk drive, compact-disk read-only-memory (CD-ROM) drive, digital versatile disk (DVD) drive, flash memory, memory stick, transistor-based memory or other computer-readable memory device as is known in the art for storing and retrieving data. Significantly, storage medium 240 may be remotely located from processor 202, and be connected to processor 202 via a network 110 such as a local area network (LAN), a wide area network (WAN), or the Internet.

Microphone 210 may be any suitable microphone as is known in the art for providing audio signals to processor 202. In addition, a speaker 218 may be attached for reproducing audio signals from processor 202. Video input 122 may be a digital or analog video camera device to record still or moving images. It is understood that microphone 210, speaker 218, and data port 214 may include appropriate digital-to-analog and analog-to-digital conversion circuitry as appropriate.

Data port 214 may be any data port as is known in the art for interfacing with an external accessory using a data protocol such as RS-232, Universal Serial Bus (USB), or Institute of Electrical and Electronics Engineers (IEEE) Standard No. 1394 ('Firewire'). In some embodiments, data port 214 may be any interface as known in the art for communicating or transferring files across a computer network, examples of such networks include Transmission Control Protocol/Internet Protocol (TCP/IP), Ethernet, Fiber Distributed Data Interface (FDDI), token bus, or token ring networks. In addition, on some systems, data port 214 may consist of a modem connected to network interface 216. Similarly, in some embodiments network interface 216 provides connectivity to decryption device 120 to communicate with a network 110. Thus, the network interface 216 allows the decryption device 120 to communicate and process input and output from across a network.

Figure 3:
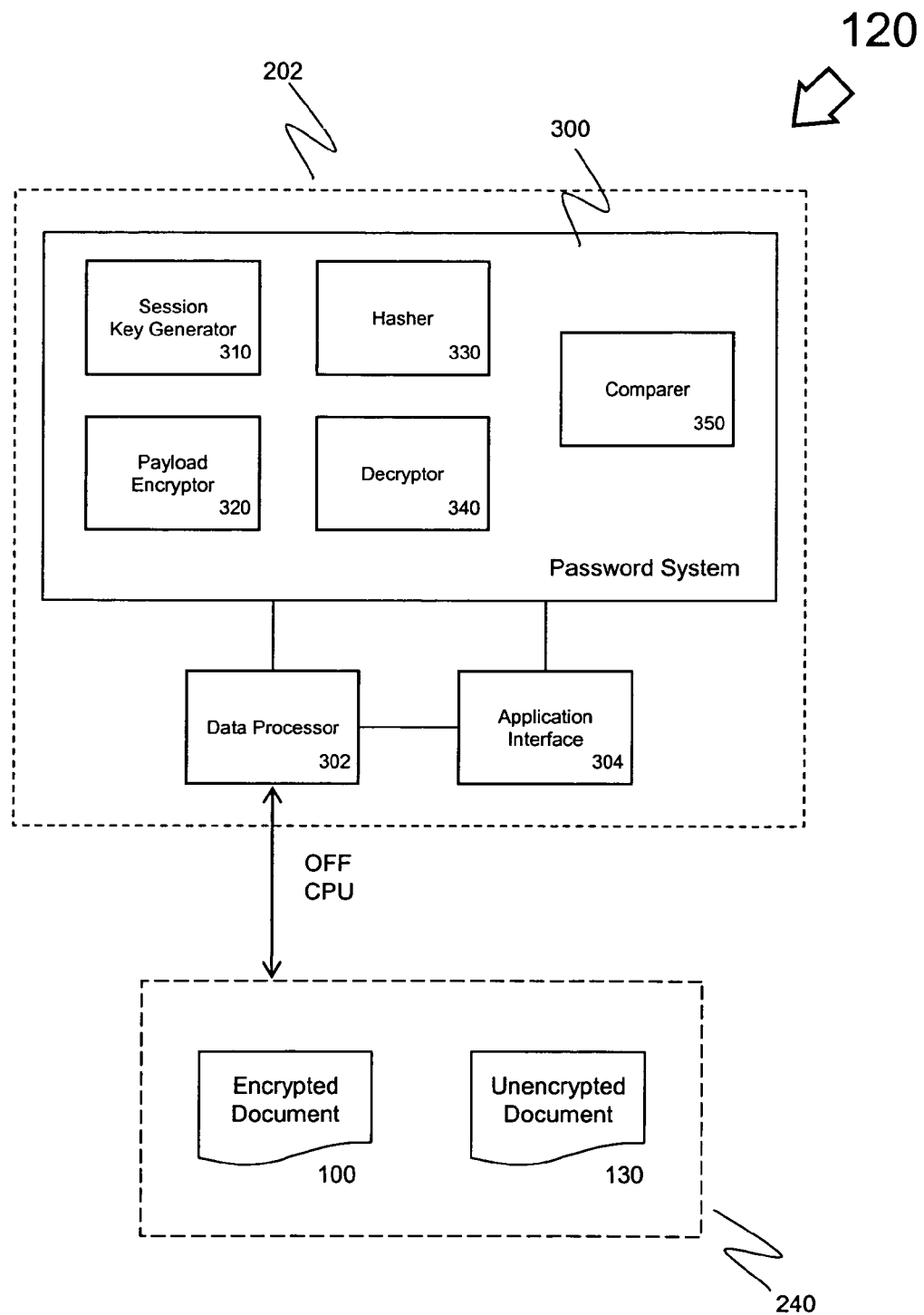
FIG. 3 is an act diagram of an apparatus that receives multiple passwords or fallback keys to unencrypt an encrypted document.

FIG. 3 is an expanded functional act diagram of CPU 202 and storage medium 240, constructed and operative in accordance with an embodiment of the present invention. It is well understood by those in the art, that the functional elements of FIG. 3 may be implemented in hardware, firmware, or as software instructions and data encoded on a computer-readable storage medium 240. As shown in FIG. 3, central processing unit 202 is functionally comprised of a password system 300, data processor 302, and an application interface 304. Password system 300 may further comprise: session key generator 310, payload encrypter 320, hasher 330, decryptor 340, comparer 350, and fallback key generator 360. These structures may be implemented as hardware, firmware, or software encoded on computer readable medium 240. In addition, as shown in FIG. 3, storage media 240 may also contain encrypted document 100, unencrypted document 130, and a master key base 140. The function of these structures may best be understood with respect to the flowchart of FIGS. 4-8, as described below.

Data processor 302 interfaces with display 206, manual input device 208, storage medium 240, microphone 210, data port 214, and network interface 216. The data processor 302 enables processor 202 to locate data on, read data from, and write data to, these components.

Application interface 304 enables processor 202 to take some action with respect to a to separate software application or entity. For example, application interface 304 may take the form of a windowing call recipient interface, as is commonly known in the art.

Password system 300 may be a window-interfaced encryption/decryption system. In some embodiments, the password system 300 may be stand-alone program, or a subset of a web-browser window or browser plug-in.

Figure 4:
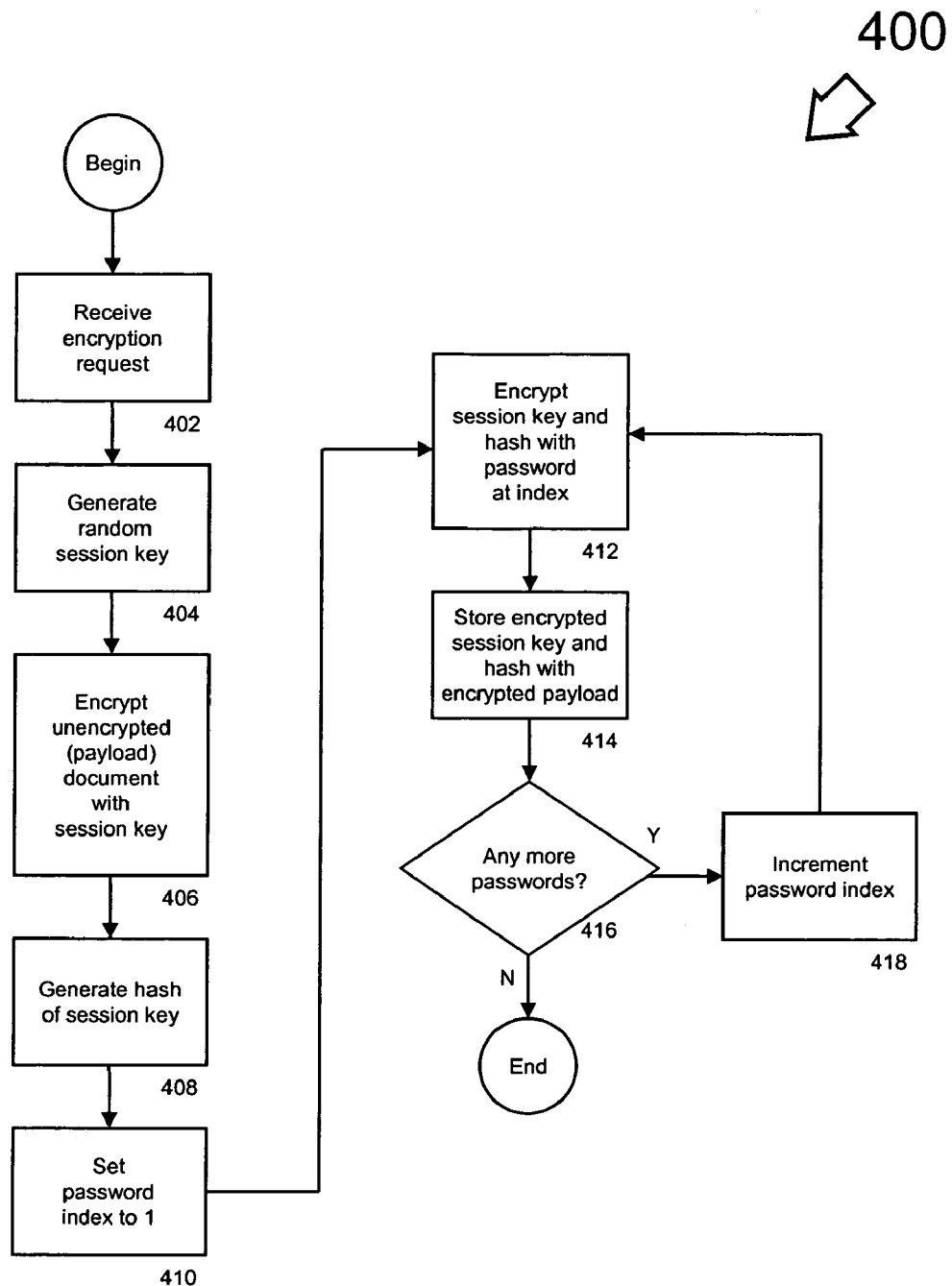
FIG. 4 is a flow chart of a method to encrypt a document with multiple passwords.

FIG. 4 flowcharts process 400, a method of encrypting a document with multiple passwords, constructed and operative in accordance with an embodiment of the present invention.

At act 402, process 400 receives a request to encrypt an unencrypted document 130. Session key generator 310 generates a random session key, act 404. Any random key generation algorithm known in the art may be used. In theory, it does not matter how the random session key is generated, and a variety of different random key generator algorithms may be used depending upon the system design tradeoffs made. For example, in a Java embodiment, Java's Random, which is a standard linear congruent method, or a Java SecureRandom ("SHA1PRNG") instance, which generates repeated SHA-1 hashes of a seed, may be used. The former algorithm is faster, although the latter is more secure.

Payload encrypter 320 encrypts the unencrypted document 130, producing an encrypted payload at act 406. Payload encrypter 320 may use a variety of encryption algorithms, including, but not limited to: ARC4, AES, RSA, 3DES, DSA, Skipjack, Blowfish, Two-Fish, or any other encryption algorithm known in the art.

At act 408, hasher 330 hashes the session key. Any hashing algorithm may be used, including, but not limited to: SHA1, MD5, or any other hashing algorithm known in the art.

A password index is set to 1, at act 410; the payload encrypter encrypts the session key and hash with the password, inserting the result at the document index at act 412. Each password is used to encrypt the session key, hash combination. The algorithm used to perform the encryption may be the same as or different from the algorithm used to encrypt the payload. The encrypted session keys and encrypted payload are combined, at act 414, and if more passwords exist, as determined by decision act 416, the password index is incremented, at act 418, and flow returns to act 412. Otherwise, if there are no more passwords, as determined by decision act 416, process 400 ends.

Figure 5:
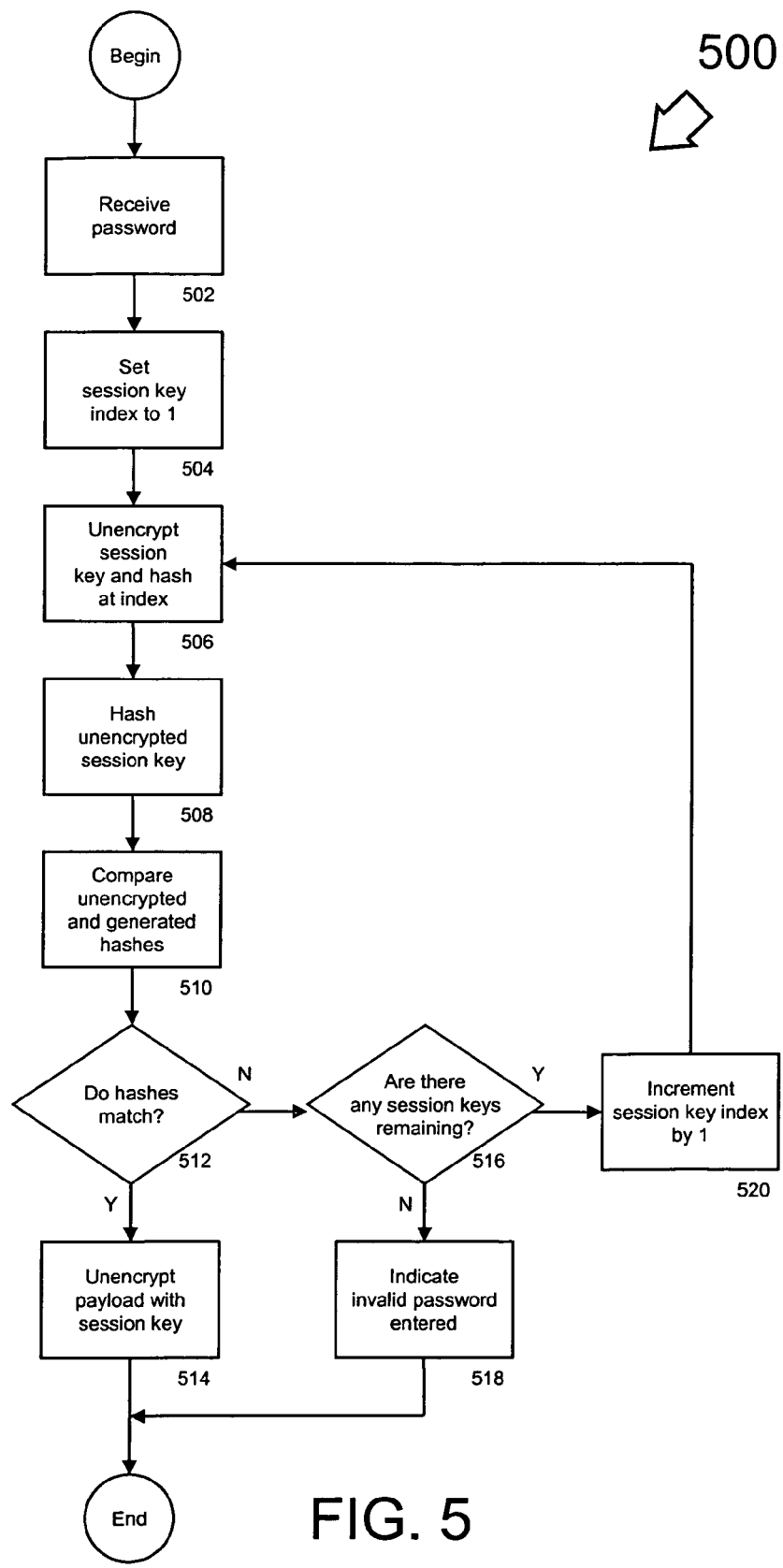
FIG. 5 is a flow chart of a method of unencrypting an encrypted document with multiple passwords.

FIG. 5 is a flow chart of process 500, a method of unencrypting an encrypted document associated with multiple passwords, constructed and operative in accordance with an embodiment of the present invention.

Initially, at act 502, process 500 receives a password. The password may be received from a user, program, or other agent. The session key index is set to 1, act 504, and the decryptor 340 unecrypts each encrypted session key and hash in turn with the password 110, act 506. The unencryption algorithm used to perform the decryption must be the same one used to perform the encryption, as discussed above, however the implementation may be the same or different.

As the decryptor decrypts each session key, hasher 330 generates a hash of the decrypted session key, act 508, and comparer 350 compares the result with the hash contained with the session key, act 510. The hash algorithm used must be the same algorithm used during encryption, however again the implementation may or may not differ.

If a hash matches, as determine at act 512, the user has entered a valid password, and the decrypted session key is used to decrypt the encrypted payload, using the same algorithm used to encrypt the payload, act 514. Otherwise, act 516 determines whether there are any remaining session keys 516. If no session keys remain, process 500 indicates an invalid password has been entered, act 518. If session keys remain, process 500 the session key index is incremented by 1, act 520, and flow returns to act 506.

In addition to supporting multiple passwords 110*a-n*, embodiments may support any number of fallback keys 115. With so much of a user's information stored digitally and protected by passwords, a user may forget or misplace a password. When the protected information is stored on one or more central servers, forgetting a user account password may simply result in contacting a customer service agent or web site to reset the account password. However, when the password 110 is protecting an encrypted document 100, resetting a user account password is not sufficient, as the encrypted document will still be encrypted with the forgotten (document) password 110.

One way to ensure that an encrypted document remains accessible is to encrypt the document with multiple passwords, as described above. Alternatively, a document may be encrypted with one or more passwords 110*a-n*, and one or more fallback keys 115*x*. In some embodiments, a fallback key 115 would be obtained by contacting a customer service agent or web site. The fallback key 115 may be a simple word or phrase, or it may be a value generated from one or more unique characteristics of the encrypted document.

Figure 6:
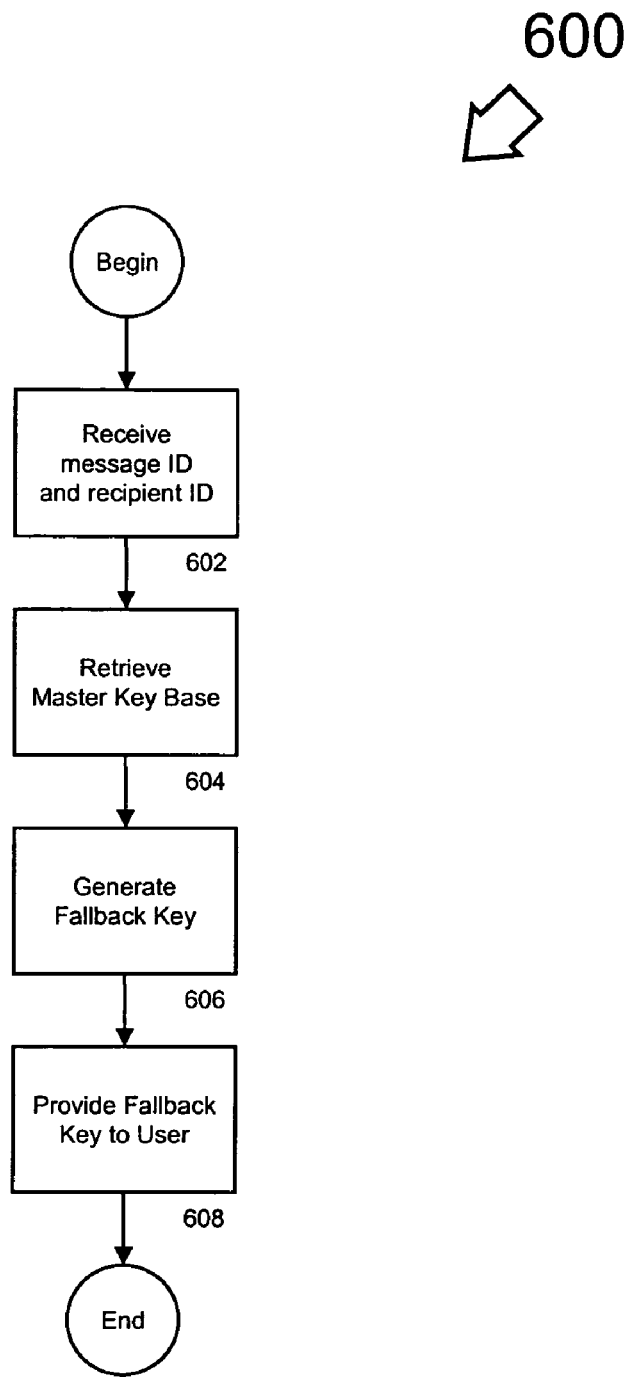
FIG. 6 is a flow chart of a method of providing a fallback key to a user.

FIG. 6 is a flow chart of a process 600 of providing a fallback key 115 to a user, constructed and operative in accordance with an embodiment of the present invention. Fallback keys 115 are any passwords or unencryption keys that may be generated to facilitate the unencryption of a document, in accordance with an embodiment of the present invention.

Upon forgetting the password for an encrypted document, the user visits a web site or contacts a customer service representative. In embodiments where a predetermined fallback key 115 exists, the fallback key is provided to the user, act 608. However, in more secure embodiments of the present invention, fallback keys 115 may be associated with one or more characteristics of the encrypted document 100, such as a message identifier and recipient identifier associated with the encrypted document; process 600 receives selected characteristics at act 602. It is understood, by those known in the art, that other document characteristics may be used, including, but not limited to: recipient identifier, message identifier, document file size, document type, document author, document editor name, document creator, document creation date, document save date, client or matter number, client name, matter name, and/or any other characteristic known in the art.

In such an embodiment, the web site or program being used by the customer service representative has been configured with a master key base, which is retrieved by process 600, act 604. This master key base 140 is combined with the message identifier and recipient identifier, for example by encrypting the message identifier and recipient identifier using the master key base 140 as the key, to produce the fallback key 115, act 606, which is detailed in greater depth below. The fallback key 115 is provided to the user, act 608. The user may then enter the fallback key 115 as to decrypt the document.

The password system 300 attempts to decrypt each encrypted session key stored in the encrypted document in turn. When an encrypted session key can be decrypted, that session key is used to decrypt the remainder of the encrypted document 100.

Figure 7:
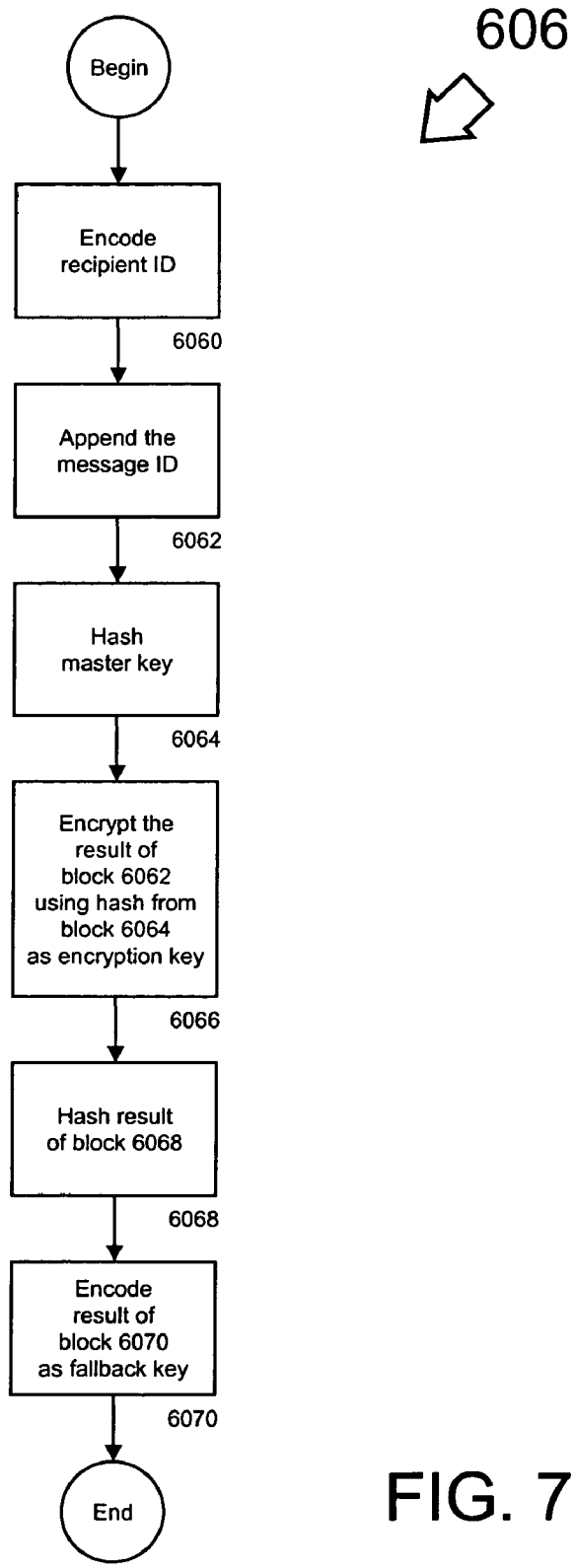
FIG. 7 is a flow chart of a method of encrypting a document with a fallback key.

FIG. 7 is a flow chart of a method 606 of generating a fallback key, constructed and operative in accordance with an embodiment of the present invention. Process 606 illustrates the acts performed by fallback key generator 360. In this embodiment, shown for illustrative purposes only, a recipient ID and message ID are used as document characteristics for the generation of a fallback key. It understood, by those known in the art, that other document characteristics may be used. A recipient ID may be any identifier that associates a document with a recipient, including, but not limited to: a name, an electronic mail address, customer number, or any other association known in the art. A message identifier may be any identifier known in the art that identifies a message, including, but not limited to: a title, a serial number, a MIME electronic-mail message identifier, or any other message identifier known in the art.

In addition, to recipient ID and message ID, method 606 may use a master key retrieved from a master key base 140. Such a master key may be any identifier known in the art. One aspect of the present invention is that the master key is kept secret from users so that unauthorized users cannot reverse-engineer a fallback keys.

Initially, at act 6060, the recipient identifier is encoded. Some embodiments encode the recipient identifier using a base 64 encoding. The result of the encoding is appended to the message identifier, act 6062. A master key is hashed at 6064. The hash is used as the key to encrypt the combined recipient and message identifiers, act 6066. The encryption algorithms used may be the same or different from the algorithms discussed above, including, but not limited to: ARC4, AES, RSA, 3DES, DSA, Skipjack, Blowfish, Two-Fish, or any other encryption algorithm known in the art. The encrypted result is hashed at act 6068. Once again, any hashing algorithm may be used, including, but not limited to: SHA1, MD5, or any other hashing algorithm known in the art. Finally, this last result is encoded at act 6070.

The algorithm encompassed by this method embodiment can be expressed as:

fallback key=Encode(Hash(Encrypt(Hash(Master Key),Encode(Recipient ID)+Message ID)))

It is understood by those known in the art that various modifications to the inventive concept of using and generating a fallback key with document characteristics will be readily apparent to those skilled in the art, and the generic principles defined by the above description may be applied to other embodiments without the use of inventive faculty.

Figure 8:
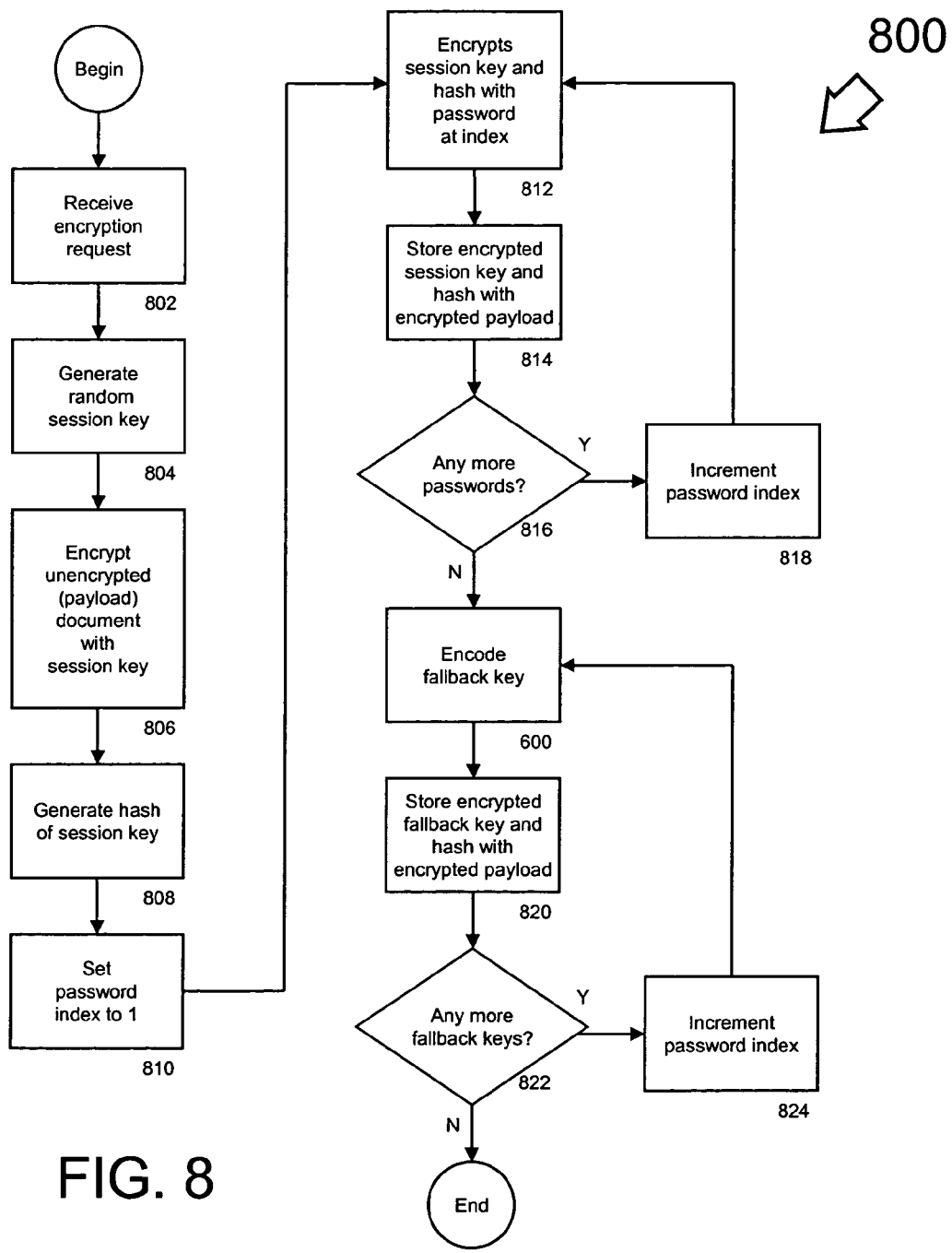
FIG. 8 is a flow chart of a method of unencrypting an encrypted document with fallback keys.

FIG. 8 is a flow chart of a process 800 of unencrypting an encrypted document with fallback keys constructed and operative in accordance with an embodiment of the present invention. This embodiments facilitates unencryption of an encrypted document with one or more passwords and one or more fallback keys.

At act 802, process 800 receives a request to encrypt an unencrypted document 130. Process 800 generates a random session key at act 804. Any random key generation algorithm known in the art may be used. In theory, it does not matter how the random session key is generated, and a variety of different random key generator algorithms may be used depending upon the system design tradeoffs made. For example, in a Java embodiment, Java's Random, which is a standard linear congruent method, or a Java SecureRandom ("SHA1PRNG") instance, which generates repeated SHA-1 hashes of a seed, may be used. As mentioned above, the former algorithm is faster, although the latter is more secure.

Process 800 encrypts the unencrypted document 130, producing an encrypted payload at act 806. Process 800 may use a variety of encryption algorithms, including, but not limited to: ARC4, AES, RSA, 3DES, DSA, Skipjack, Blowfish, Two-Fish, or any other encryption algorithm known in the art.

At act 808, process 800 hashes the session key. Any hashing algorithm may be used, including, but not limited to: SHA1, MD5, or any other hashing algorithm known in the art.

At act 810, a password index is set to 1; the payload encrypter encrypts the session key and hash with the password, inserting the result at the document index at act 812. Each password is used to encrypt the session key, hash combination. The algorithm used to perform the encryption may be the same as or different from the algorithm used to encrypt the payload. The encrypted session keys and encrypted payload are combined, at act 814, and if more passwords exist, as determined by decision act 816, the password index is incremented, at act 818, and flow returns to act 812.

When there are no more passwords, as determined by decision act 816, process 800 encodes a fallback key using process 600. It is understood, that in some embodiments, process 600 may be the process described in FIG. 6, or may more simply be a standard predefined text and/or numeric strings.

The fallback key 115 is encrypted and encrypted payload are combined, at act 820, and if more fallback key 115 exist, as determined by decision act 822, the password index is incremented, at act 824, and flow returns to act 600.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

The invention claimed is:

1. An apparatus to encrypt a payload, comprising:
a session key generator configured to generate a session key;
a hasher configured to generate a hash of the session key;
a payload encrypter configured to encrypt the payload with the session key, to encrypt both the session key and the hash of the session key using a received password, and to store in a file: the encrypted payload, the password-encrypted session key, and the encrypted hash of the session key;
wherein the payload encrypter is further configured to encrypt the session key using a fallback key, and append the fallback-encrypted session key to the file;
wherein the payload encrypter is further configured to send the file to a receiver;
a decryptor, coupled to the receiver, the decryptor configured to receive the password, and to decrypt the password-encrypted session key to obtain a decrypted session key, and to decrypt the encrypted hash of the session key to obtain a first hash of the session key;
a second hasher configured to hash the decrypted session key to obtain a second hash of the session key;
a comparer configured to compare the first hash of the session key with the second hash of the session key; and
wherein the decryptor is further configured to decrypt the encrypted payload, using the session key decrypted with the password, when the first hash of the session key matches the second hash of the session key;
wherein the decryptor is further configured to decrypt, in response to determining that the first hash of the session key does not match the second hash of the session key, the fallback-encrypted session key, using the fallback key, and to decrypt the encrypted payload using the session key decrypted with the fallback key.

2. The apparatus of 1 wherein the session key generator generates the session key randomly.

3. The apparatus of 2, wherein the payload encrypter is further configured to receive more than one password.

4. The apparatus of 3 wherein the payload encrypter is further configured to encrypt the hash of the session key for each password received.

5. The apparatus of 4 wherein the payload encrypter is further configured to store in the file the encrypted hash of the session key for each password received.

6. The apparatus of 5 wherein hashing the session key with a received password uses: SHA1 or MD5 algorithms.

7. The apparatus of 5 wherein the encryption of the payload with the session key or the encryption of the hash of the session key uses: ARC4, AES, RSA, 3DES, DSA, Skipjack, Blowfish, or Two-Fish algorithms.

8. A method of encrypting a payload, comprising:
generating a session key;
encrypting the payload with the session key;
generating a hash of the session key;
encrypting both the session key and the hash of the session key using a received password;
storing an encrypted file with the encrypted payload, the password-encrypted session key, and the encrypted hash of the session key;
encrypting the session key using a fallback key, and appending the fallback-encrypted second session key to the file;
sending the encrypted file with the encrypted payload, the password-encrypted session key, the encrypted hash of the session key, and the fallback-encrypted session key to a receiver;
decrypting the password-encrypted session key to obtain a decrypted session key;
decrypting the encrypted hash of the session key to obtain a first hash of the session key;
generating a second hash of the session key from the decrypted session key; and
if the first hash of the session key matches the second hash of the session key, decrypting the encrypted payload using the session key decrypted with the password;
in response to determining that the first hash of the session key does not match the second hash of the session key, decrypting the fallback-encrypted session key with the fallback key and decrypting the encrypted payload using the session key decrypted with the fallback key.

9. The method of 8 wherein the session key is generated randomly.

10. The method of 9 further comprising:
receiving more than one password.

11. The method of 10 further comprising:
encrypting the hash of the session key for each password received.

12. The method of 11 further comprising:
storing in the encrypted file: the encrypted hash of the session key for each password received.

13. The method of 12 wherein hashing the session key with a received password uses: SHA1 or MD5 algorithms.

14. The method of 12 wherein the encryption of the payload with the session key or the encryption of the hash of the session key uses: ARC4, AES, RSA, 3DES, DSA, Skipjack, Blowfish, or Two-Fish algorithms.

15. An apparatus to encrypt a payload, comprising:
means for generating a session key;
means for encrypting the payload with the session key;
means for generating a hash of the session key;
means for encrypting both the session key and the hash of the session key using a received password;
means for encrypting the session key using a fallback key;
means for storing an encrypted file with: the encrypted payload, the password-encrypted session key, the encrypted hash of the session key, and the fallback-encrypted session key;
means for sending the encrypted file with the encrypted payload, the password-encrypted session key, the encrypted hash of the session key, and the fallback-encrypted session key to a receiver;
means for decrypting the password encrypted session key to obtain a decrypted session key;
means for decrypting the encrypted hash of the session key to obtain a first hash of the session key;
means for generating a second hash of the session key from the decrypted session key; and
means for decrypting the encrypted payload with the decrypted session key if the first hash of the session key matches the second hash of the session key;
means for decrypting, in response to determining that the first hash of the session key does not match the second hash of the session key, the fallback-encrypted session key using the fallback key, and decrypting the encrypted payload using the session key decrypted with the fallback key.

16. The apparatus of 15 wherein the session key generator generates the session key randomly.

17. The apparatus of 16 further comprising:
means for receiving more than one password.

18. The apparatus of 17 further comprising: means for encrypting the hash of the session key for each password received.

19. The apparatus of 18 further comprising:
means for storing in the encrypted file the encrypted hash of the session key for each password received.

20. The apparatus of 19 wherein the means for hashing the session key with a received password uses: SHA1 or MD5 algorithms.

21. The apparatus of 19 wherein the means for encrypting the payload with the session key or the means for the encryption of the hash of the session key uses: ARC4, AES, RSA, 3DES, DSA, Skipjack, Blowfish, or Two-Fish algorithms.

22. A non-transitory computer-readable storage medium, encoded with data and instructions, such that when executed by a computer, the instructions causes the computer to:
generating a session key;
encrypting a payload with the session key;
generating a hash of the session key;
encrypting both the session key and the hash of the session key using a received password;
encrypting the session key with a fallback key;
storing an encrypted file with: the encrypted payload, the password-encrypted session key, the encrypted hash of the session key, and the fallback-encrypted session key;
sending the encrypted file with the encrypted payload, the password-encrypted session key, the encrypted hash of the session key, and the fallback-encrypted session key to a receiver;
decrypting the encrypted session key to obtain a decrypted session key;
decrypting the encrypted hash of the session key to obtain a first hash of the session key;
generating a second hash of the session key from the decrypted session key; and
if the first hash of the session key matches the second hash of the session key, decrypting the encrypted payload with the decrypted session key;
in response to determining that the first hash of the session key does not match the second hash of the session key, decrypting the fallback-encrypted session key using the fallback key, and decrypting the encrypted payload using the session key decrypted with the fallback key.

23. The non-transitory computer-readable medium of 22 wherein the session key generator generates the session key randomly.

24. The non-transitory computer-readable medium of 23 further comprising instructions to: receive more than one password.

25. The non-transitory computer-readable medium of 24 further comprising instructions to: encrypt the hash of the session key for each password received.

26. The non-transitory computer-readable medium of 25 further comprising instructions to: store in the encrypted file the encrypted hash of the session key for each password received.

27. The non-transitory computer-readable medium of 26 wherein hashing the session key with a received password uses: SHA1 or MD5 algorithms.

28. The non-transitory computer-readable medium of 26 wherein the encryption of the payload with the session key or the encryption of the hash of the session key uses: ARC4, AES, RSA, 3DES, DSA, Skipjack, Blowfish, or Two-Fish algorithms.

29. An apparatus to decrypt an encrypted file, the encrypted file including an encrypted payload, a password-encrypted session key, an encrypted hash of the session key, and a fallback-encrypted session key, comprising:
a decryptor configured to receive a password, the encrypted file with the encrypted payload, the password-encrypted session key, the encrypted hash of the session key and the fallback-encrypted hash, and to decrypt both the password-encrypted session key and the encrypted hash of the session key using the password;
a hasher configured to hash the decrypted session key;
a comparer configured to compare the hashed decrypted session key with the hash of the session key; and
wherein the decryptor is further configured to decrypt the file payload when the hashed decrypted session key matches the hash of the session key;
wherein the decryptor is further configured to decrypt, in response to determining that the hashed decrypted session key does not match the hash of the session key, the file payload using the session key decrypted using the fallback key.

30. The apparatus of 29 wherein the decryptor is further configured to decrypt another encrypted session key and a second hash value, the comparer is further configured to compare the second hash value with a hash of the decrypted another session key, and the decryptor is configured to decrypt the file payload when the second hash value matches the hash of the decrypted another session key.

31. The apparatus of 30 wherein the decryption of the another session key uses: ARC4, AES, RSA, 3DES, DSA, Skipjack, Blowfish, or Two-Fish algorithms.

32. The apparatus of 30 wherein hashing the session key with a received password uses: SHA1 or MD5 algorithms.

33. The apparatus of 30 wherein hashing the another decrypted session key with a received password uses: SHA1 or MD5 algorithms.

34. The apparatus of 30 wherein the encryption of the payload uses: ARC4, AES, RSA, 3DES, DSA, Skipjack, Blowfish, or Two-Fish algorithms.

35. A method of decrypting an encrypted file, the encrypted file including an encrypted payload, a password-encrypted session key, an encrypted hash of the session key, and a fallback-encrypted session key, comprising:
receiving a password;
receiving the encrypted file with the encrypted payload, the password-encrypted session key, the encrypted hash of the session key, and the fallback-encrypted session key;
decrypting the password-encrypted session key using the password;
decrypting the encrypted hash of the session key using the password;
generating a hash of the decrypted session key;
comparing the hashed decrypted session key with the hash of the session key; and
decrypting the file payload using the decrypted session key when the hashed decrypted session key matches the hash of the session key;
in response to determining that the hashed decrypted session key does not match the hash of the session key, decrypting the fallback-encrypted session key using a fallback key, and decrypting the file payload with the session key decrypted with the fallback key.

36. The method of 35 further comprising:
decrypting another encrypted session key and a second hash value, comparing the second hash value with a hash of the decrypted another session key;
decrypting the file payload when the second hash value matches the hash of the decrypted another session key.

37. The method of 36 wherein the decryption of the another session key uses: ARC4, AES, RSA, 3DES, DSA, Skipjack, Blowfish, or Two-Fish algorithms.

38. The method of 36 wherein hashing the session key with a received password uses: SHA1 or MD5 algorithms.

39. The method of 36 wherein hashing the another decrypted session key with a received password uses: SHA1 or MD5 algorithms.

40. The method of 36 wherein the encryption of the payload uses: ARC4, AES, RSA, 3DES, DSA, Skipjack, Blowfish, or Two-Fish algorithms.

41. An apparatus to decrypt an encrypted file, the encrypted file including an encrypted payload, a password-encrypted session key, an encrypted hash of the session key, and a fallback-encrypted session key, comprising:
   means for receiving a password;
   means for receiving the encrypted file with the encrypted payload, the password-encrypted session key, the encrypted hash of the session key, and the fallback-encrypted session key;
   means for decrypting the password-encrypted session key using the password;
   means for decrypting the decrypted hash of the session key using the password;
   means for generating a hash of the decrypted session key;
   means for comparing the hashed decrypted session key with the hash of the session key;
   means for decrypting the file payload, using the session key decrypted with the password, when the hashed decrypted session key matches the hash of the session key;
   means for decrypting, in response to determining that the hashed decrypted session key does not match the hash of the session key, the fallback-encrypted session key using a fallback key, and decrypting the file payload using the session key decrypted with the fallback key.

42. The apparatus of 41 further comprising:
   means for decrypting another encrypted session key and a second hash value, comparing the second hash value with a hash of the decrypted another session key;
   means for decrypting the file payload when the second hash-value matches the hash of the decrypted another session key.

43. The apparatus of 42 wherein the decryption of the another session key uses: ARC4, AES, RSA, 3DES, DSA, Skipjack, Blowfish, or Two-Fish algorithms.

44. The apparatus of 42 wherein hashing the session key with a received password uses: SHA1 or MD5 algorithms.

45. The apparatus of 42 wherein hashing the another decrypted session key with a received password uses: SHA1 or MD5 algorithms.

46. The apparatus of 42 wherein the encryption of the payload uses: ARC4, AES, RSA, 3DES, DSA, Skipjack, Blowfish, or Two-Fish algorithms.

47. A non-transitory computer-readable storage medium, encoded with an encrypted file, data and instructions, the encrypted file including an encrypted payload, a password-encrypted session key, an encrypted hash of the session key, and a fallback-encrypted session key, such that when executed by a computer, the instructions cause the computer to:
   receive a password;
   receive the encrypted file with the encrypted payload, the password-encrypted session key, the encrypted hash of the session key, and the fallback-encrypted session key;
   decrypt the password-encrypted session key using the password;
   decrypt the encrypted hash of the session key using the password;
   generate a hash of the decrypted session key;
   compare the hashed decrypted session key with the hash of the session key; and
   decrypt the file payload using the session key decrypted with the password when the hashed decrypted session key matches the hash of the session key;
   in response to determining that the hashed decrypted session key does not match the hash of the session key, decrypt the fallback-encrypted session key with the fallback key, and decrypt the file payload with the session key decrypted with the fallback key.

48. The non-transitory computer-readable medium of 47 is further configured with instructions causing a computer to:
   decrypt another encrypted session key and a second hash value, comparing the second hash value with a hash of the decrypted another session key;
   decrypt the file payload when the second hash value matches the hash of the decrypted another session key.

49. The non-transitory computer-readable medium of 48 wherein the decryption of the another session key uses: ARC4, AES, RSA, 3DES, DSA, Skipjack, Blowfish, or Two-Fish algorithms.

50. The non-transitory computer-readable medium of 48 wherein hashing the session key with a received password uses: SHA1 or MD5 algorithms.

51. The non-transitory computer-readable medium of 48 wherein hashing the another decrypted session key with a received password uses: SHA1 or MD5 algorithms.

52. The non-transitory computer-readable medium of 48 wherein the encryption of the payload uses: ARC4, AES, RSA, 3DES, DSA, Skipjack, Blowfish, or Two-Fish algorithms.

* * * * *

UNITED STATES PATENT AND TRADEMARK OFFICE
CERTIFICATE OF CORRECTION

| | | |
|---|---|---|
| PATENT NO. | : 7,814,317 B1 | Page 1 of 1 |
| APPLICATION NO. | : 10/969220 | |
| DATED | : October 12, 2010 | |
| INVENTOR(S) | : Brian L. Matthews et al. | |

It is certified that error appears in the above-identified patent and that said Letters Patent is hereby corrected as shown below:

Column 7, Claim 1, line 8, replace "encrypter" with --encryptor--
Column 7, Claim 1, line 12, replace "encrypter" with --encryptor--
Column 7, Claim 1, line 15, replace "encrypter" with --encryptor--
Column 7, Claim 3, line 38, replace "encrypter" with --encryptor--
Column 7, Claim 4, line 40, replace "encrypter" with --encryptor--
Column 7, Claim 5, line 43, replace "encrypter" with --encryptor--

Signed and Sealed this
Fourth Day of January, 2011

David J. Kappos
*Director of the United States Patent and Trademark Office*